(12) United States Patent
Gurney

(10) Patent No.: US 10,828,809 B2
(45) Date of Patent: Nov. 10, 2020

(54) CONTINUOUSLY COMPRESSION MOLDING A COMPOSITE BODY WITH A COMPLEX GEOMETRY

(71) Applicant: Rohr, Inc., Chula Vista, CA (US)

(72) Inventor: Andrew S. Gurney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 270 days.

(21) Appl. No.: 15/942,931

(22) Filed: Apr. 2, 2018

(65) Prior Publication Data

US 2019/0299500 A1 Oct. 3, 2019

(51) Int. Cl.

| | |
|---|---|
| B29C 43/26 | (2006.01) |
| B29C 43/22 | (2006.01) |
| B29C 43/44 | (2006.01) |
| B29K 105/08 | (2006.01) |
| B29K 101/12 | (2006.01) |
| B29L 31/00 | (2006.01) |
| F01D 25/24 | (2006.01) |
| B29L 9/00 | (2006.01) |
| B29C 43/28 | (2006.01) |

(52) U.S. Cl.
CPC .......... *B29C 43/265* (2013.01); *B29C 43/224* (2013.01); *B29C 43/28* (2013.01); *B29C 43/44* (2013.01); *B29K 2101/12* (2013.01); *B29K 2105/0872* (2013.01); *B29L 2009/00* (2013.01); *B29L 2031/003* (2013.01); *F01D 25/24* (2013.01); *F05D 2220/323* (2013.01); *F05D 2230/23* (2013.01); *F05D 2240/10* (2013.01); *F05D 2300/603* (2013.01)

(58) Field of Classification Search
None
See application file for complete search history.

(56) References Cited

U.S. PATENT DOCUMENTS

| | | |
|---|---|---|
| 5,026,514 A | 6/1991 | Hauwiller et al. |
| 9,707,726 B2 | 7/2017 | Reinhold et al. |
| 2009/0243151 A1 | 10/2009 | Aijima |
| 2011/0189327 A1* | 8/2011 | Kojima ................ B29C 43/00 425/193 |
| 2011/0206906 A1 | 8/2011 | Rubin et al. |
| 2016/0361879 A1* | 12/2016 | Johnson ................ F01D 5/28 |

* cited by examiner

*Primary Examiner* — Peter L Vajda
*Assistant Examiner* — Paul Spiel
(74) *Attorney, Agent, or Firm* — Getz Balich LLC

(57) ABSTRACT

A method is provided for manufacturing a composite body. A first longitudinal portion of a continuous length of prepreg material is shaped using a first die of a compression molding tool to provide a shaped first longitudinal portion of the continuous length of prepreg material. The shaped first longitudinal portion is consolidated using the compression molding tool to provide a first portion of the composite body. The first portion of the composite body is moved out of the compression molding tool. The first die is swapped for a replacement first die. A second longitudinal portion of the continuous length of prepreg material is shaped using the replacement first die of the compression molding tool to provide a shaped second longitudinal portion of the continuous length of prepreg material. The shaped second longitudinal portion is consolidated using the compression molding tool to provide a second portion of the composite body.

20 Claims, 7 Drawing Sheets

CONTINUOUSLY COMPRESSION MOLDING A COMPOSITE BODY WITH A COMPLEX GEOMETRY

BACKGROUND

1. Technical Field

This disclosure relates generally to a manufacturing a composite body and, more particularly, to continuously compression molding a composite body.

2. Background Information

Various methods and systems are known in the art for manufacturing a composite body such as a stringer for a gas turbine engine nacelle. While these known methods and systems have various benefits, there is still room in the art for improvement.

SUMMARY OF THE DISCLOSURE

According to an aspect of the present disclosure, a method is provided for manufacturing a composite body. This method includes shaping a first longitudinal portion of a continuous length of prepreg material using a first die of a compression molding tool to provide a shaped first longitudinal portion of the continuous length of prepreg material. The shaped first longitudinal portion of the continuous length of prepreg material is consolidated using the compression molding tool to provide a first portion of the composite body. The first portion of the composite body is moved out of the compression molding tool. The first die is swapped for a replacement first die. A second longitudinal portion of the continuous length of prepreg material is shaped using the replacement first die of the compression molding tool to provide a shaped second longitudinal portion of the continuous length of prepreg material. The shaped second longitudinal portion of the continuous length of prepreg material is consolidated using the compression molding tool to provide a second portion of the composite body.

According to another aspect of the present disclosure, another method is provided for manufacturing a composite body. This method includes molding a first longitudinal portion of a continuous length of prepreg material into a first portion of the composite body using a first die, wherein the first die provides the first portion of the composite body with a first configuration. The first die is swapped for a replacement first die. A second longitudinal portion of the continuous length of prepreg material is molded into a second portion of the composite body using the replacement first die, wherein the replacement first die provides the second portion of the composite body with a second configuration that is different from the first configuration. The continuous length of prepreg material is configured from or otherwise includes fibrous material pre-impregnated with resin.

According to another aspect of the present disclosure, still another method is provided for manufacturing a composite body. This method includes molding a first longitudinal portion of a continuous length of prepreg material into a first portion of the composite body using a first die. The first die has a die first configuration. The first die is swapped for a replacement first die. The replacement first die has a die second configuration that is different from the die first configuration. A second longitudinal portion of the continuous length of prepreg material is molded into a second portion of the composite body using the replacement first die. The continuous length of prepreg material is configured from or otherwise includes fibrous material pre-impregnated with resin.

The first die may be configured to provide the first portion of the composite body with a first curvature. The replacement first die may be configured to provide the second portion of the composite body with a second curvature that is different from the first curvature.

The first die may have a die first configuration. The replacement first die may have a die second configuration that is different from the die first configuration.

The first die may be configured to provide the shaped first longitudinal portion of the continuous length of prepreg material with a first curvature. The replacement first die may be configured to provide the shaped second longitudinal portion of the continuous length of prepreg material with a second curvature that is different from the first curvature.

The first die may be configured to provide the shaped first longitudinal portion of the continuous length of prepreg material with a first cross-sectional geometry. The replacement first die may be configured to provide the shaped second longitudinal portion of the continuous length of prepreg material with a second cross-sectional geometry that is different from the first cross-sectional geometry.

The first die may be configured to provide the shaped first longitudinal portion of the continuous length of prepreg material with a first cross-sectional shape. The replacement first die may be configured to provide the shaped second longitudinal portion of the continuous length of prepreg material with a second cross-sectional shape that is different from the first cross-sectional shape.

The first die may be configured to provide the shaped first longitudinal portion of the continuous length of prepreg material with a first cross-sectional size. The replacement first die may be configured to provide the shaped second longitudinal portion of the continuous length of prepreg material with a second cross-sectional size that is different from the first cross-sectional size.

The consolidating of the shaped first longitudinal portion of the continuous length of prepreg material may include heating and applying pressure to the shaped first longitudinal portion of the continuous length of prepreg material using the first die. The consolidating of the shaped second longitudinal portion of the continuous length of prepreg material may include heating and applying pressure to the shaped second longitudinal portion of the continuous length of prepreg material using the replacement first die.

The method may also include swapping a second die for a replacement second die. The shaping of the first longitudinal portion of the continuous length of prepreg material may include shaping the first longitudinal portion of the continuous length of prepreg material using the first die and the second die to provide the shaped first longitudinal portion of the continuous length of prepreg material. The shaping of the second longitudinal portion of the continuous length of prepreg material may include shaping the second longitudinal portion of the continuous length of prepreg material using the replacement first die and the replacement second die to provide the shaped second longitudinal portion of the continuous length of prepreg material.

The method may include: (A) moving the second portion of the composite body out of the compression molding tool; (B) swapping the replacement first die for a second replacement first die; (C) shaping a third longitudinal portion of the continuous length of prepreg material using the second replacement first die of the compression molding tool to provide a shaped third longitudinal portion of the continuous length of prepreg material; and (D) consolidating the shaped third longitudinal portion of the continuous length of prepreg material using the compression molding tool to provide a third portion of the composite body.

The method may include: (A) moving the second portion of the composite body out of the compression molding tool; (B) shaping a third longitudinal portion of the continuous length of prepreg material using the replacement first die of the compression molding tool to provide a shaped third longitudinal portion of the continuous length of prepreg material; and (C) consolidating the shaped third longitudinal portion of the continuous length of prepreg material using the compression molding tool to provide a third portion of the composite body.

The continuous length of prepreg material may be configured from or otherwise include fibrous material pre-impregnated with thermoplastic resin.

The composite body may be configured as or otherwise include a component of a nacelle for an aircraft propulsion system.

The first die may be arranged at a molding position in the compression molding tool during the shaping of the first longitudinal portion of the continuous length of prepreg material. The swapping may include removing the first die from the molding position and arranging the replacement first die at the molding position. The replacement first die may be arranged at the molding position during the shaping of the second longitudinal portion of the continuous length of prepreg material.

The method may also include providing a compression molding tool. The first die and the replacement first die may both be configured with the compression molding tool during the molding of the first longitudinal portion of the continuous length of prepreg material.

The first die may provide the first portion of the composite body with a body first configuration. The replacement first die may provide the second portion of the composite body with a body second configuration that is different from the body first configuration.

The molding of the first longitudinal portion of the continuous length of prepreg material may include: (A) shaping the first longitudinal portion of the continuous length of prepreg material using the first die of a compression molding tool to provide a shaped first longitudinal portion of the continuous length of prepreg material; and (B) consolidating the shaped first longitudinal portion of the continuous length of prepreg material using the compression molding tool to provide the first portion of the composite body.

The foregoing features and the operation of the invention will become more apparent in light of the following description and the accompanying drawings.

DETAILED DESCRIPTION

Figure 1:
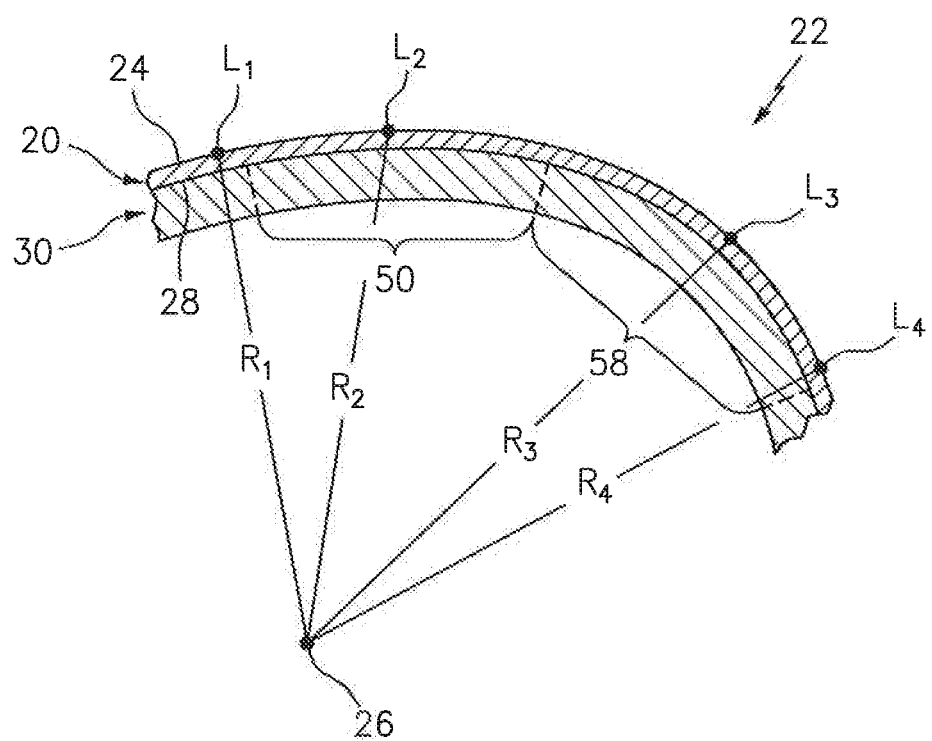
FIG. 1 is an exaggerated sectional illustration of a portion of a nacelle component.

An exterior skin 20 of a nacelle 22 for a modem gas turbine engine propulsion system may have a complex geometry, an exaggerated exemplary portion of which is shown in FIG. 1. This exemplary exterior skin 20 of FIG. 1 has an exterior flow surface 24 with a compound curvature; e.g., a splined curvature. Such a compound curvature may be defined by a radius that periodically or continuously changes (e.g., increases, decreases) as the flow surface 24 extends circumferentially about an axial centerline 26 of the nacelle 22, for example when viewed in a plane perpendicular to the centerline 26 (e.g., plane of FIG. 1). In the exemplary embodiment of FIG. 1, the radius of the flow surface 24 has a first value $R_1$ at a first circumferential location $L_1$, a second value $R_2$ at a second circumferential location $L_2$, a third value $R_3$ at a third circumferential location $L_3$, and a fourth value $R_4$ at a fourth circumferential location $L_4$, where $R_1 < R_2 < R_3$ and $R_4 < R_3$. Of course, the exterior skin 20 and its flow surface 24 may also or alternatively have a compound curvature when viewed in a plane parallel to or acutely angled to the centerline 26.

The exterior skin 20 of FIG. 1 has a relatively small (e.g., constant) radial thickness defined between its opposing surfaces 24 and 28. As a result, the exterior skin 20 in-and-of-itself may be relatively flexible. To support and increase the structural rigidity of the exterior skin 20, the nacelle 22 component of FIG. 1 includes one or more longitudinally elongated structural supports; e.g., stringers. One or more of these structural supports 30 (one shown in FIG. 1) may each have a longitudinal length that runs circumferentially about the centerline 26 of the nacelle 22. In addition or alternatively, one or more of the structural supports may each have a longitudinal length that runs axially along the centerline 26.

The structural support 30 of FIG. 1 generally follows the curvature of the exterior skin 20 to ensure radial engagement (e.g., contact, attachment) along the (e.g., entire) longitudinal length thereof. As a result, the structural support 30 of FIG. 1 is provided with a compound curvature that is similar (e.g., proportional) to the compound curvature of the exterior skin 20 and its flow surface 24.

Manufacturing a structural support such a that shown in FIG. 1 from composite material using known manufacturing techniques can be time consuming, laborious and/or costly. For example, using a traditional composite manufacturing technique, prepreg material must be laid-up by hand and then consolidated in such a manner so as to form an entirety of the structural support in single step using large non-reconfigurable molds. Even small changes to the design (e.g., curvature, cross-section, etc.) of the structural support may require provision of new molds.

To address at least some of the above deficiencies, the present disclosure includes improved methods and systems for manufacturing a. composite structural support. As described below in further detail, these methods and systems may at least partially automate manufacture of the composite structural support. These methods and systems may also or alternatively reduce costs associated with changes in composite structural support design.

For ease of description, the methods and systems of the present disclosure are described herein relating to manufacture of the composite support 30 of FIG. 1. However, the systems and methods of the present disclosure are not limited thereto. In particular, the methods and systems of the present disclosure may be used to manufacture any type of composite body; e.g., a body comprising fiber reinforcement within a resin matrix. This composite body may be configured as a longitudinally elongated body such as a stringer, a spar, a rib, a beam, a strut or any other type of longitudinally elongated structural support. The composite body may be configured as a structural element of a turbofan propulsion system nacelle such as the structural support 30 of FIG. 1. Alternatively, the composite body may be a structural element for an aircraft wing or fuselage. The methods and systems of the present disclosure, however, are not limited to manufacturing structural bodies for aircraft applications. Furthermore, the methods and systems of the present disclosure may also manufacture (e.g., longitudinally elongated) non-structural bodies.

Figure 2:
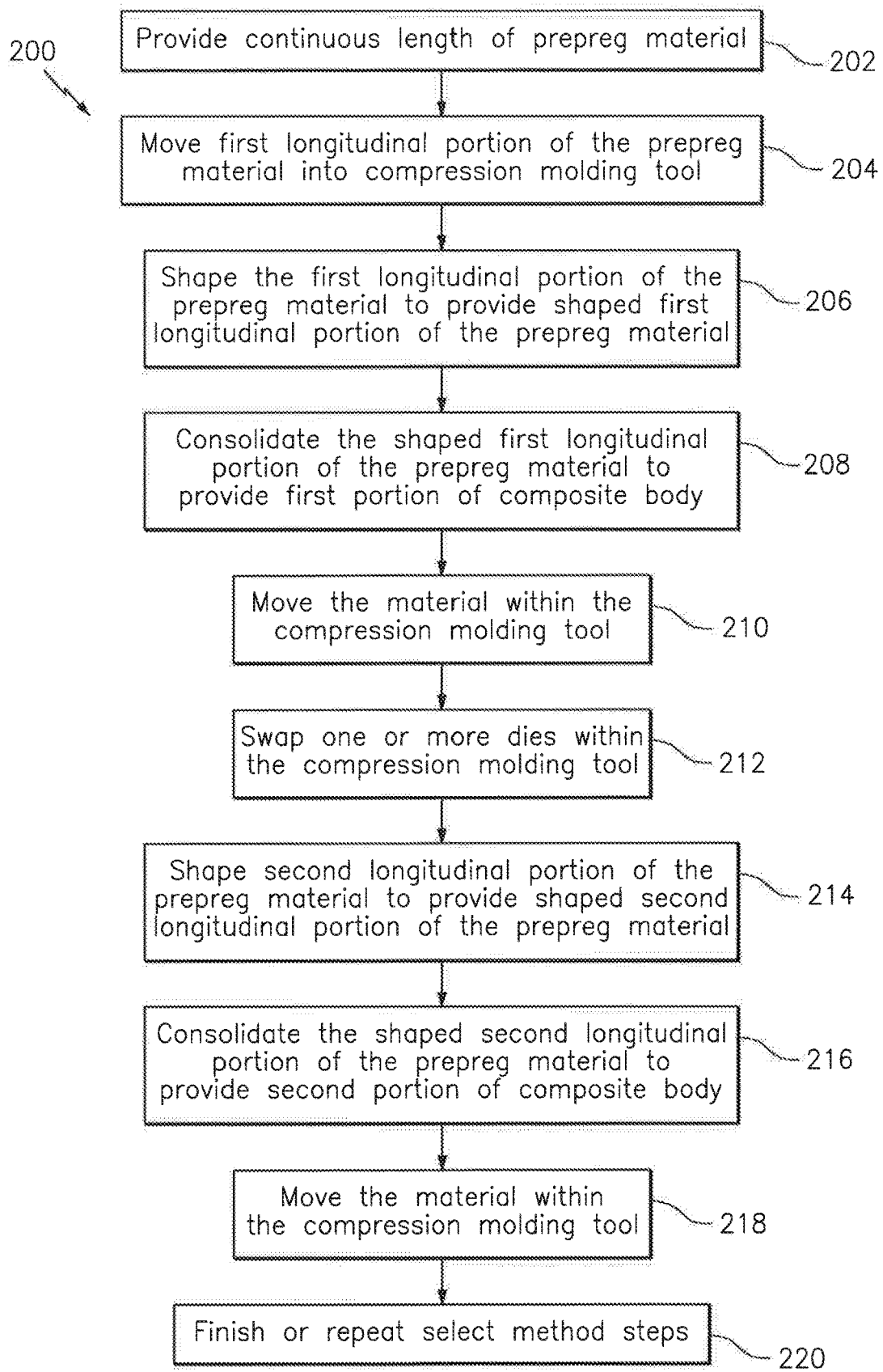
FIG. 2 is a flow diagram of a method for manufacturing a composite body.
Figure 3:
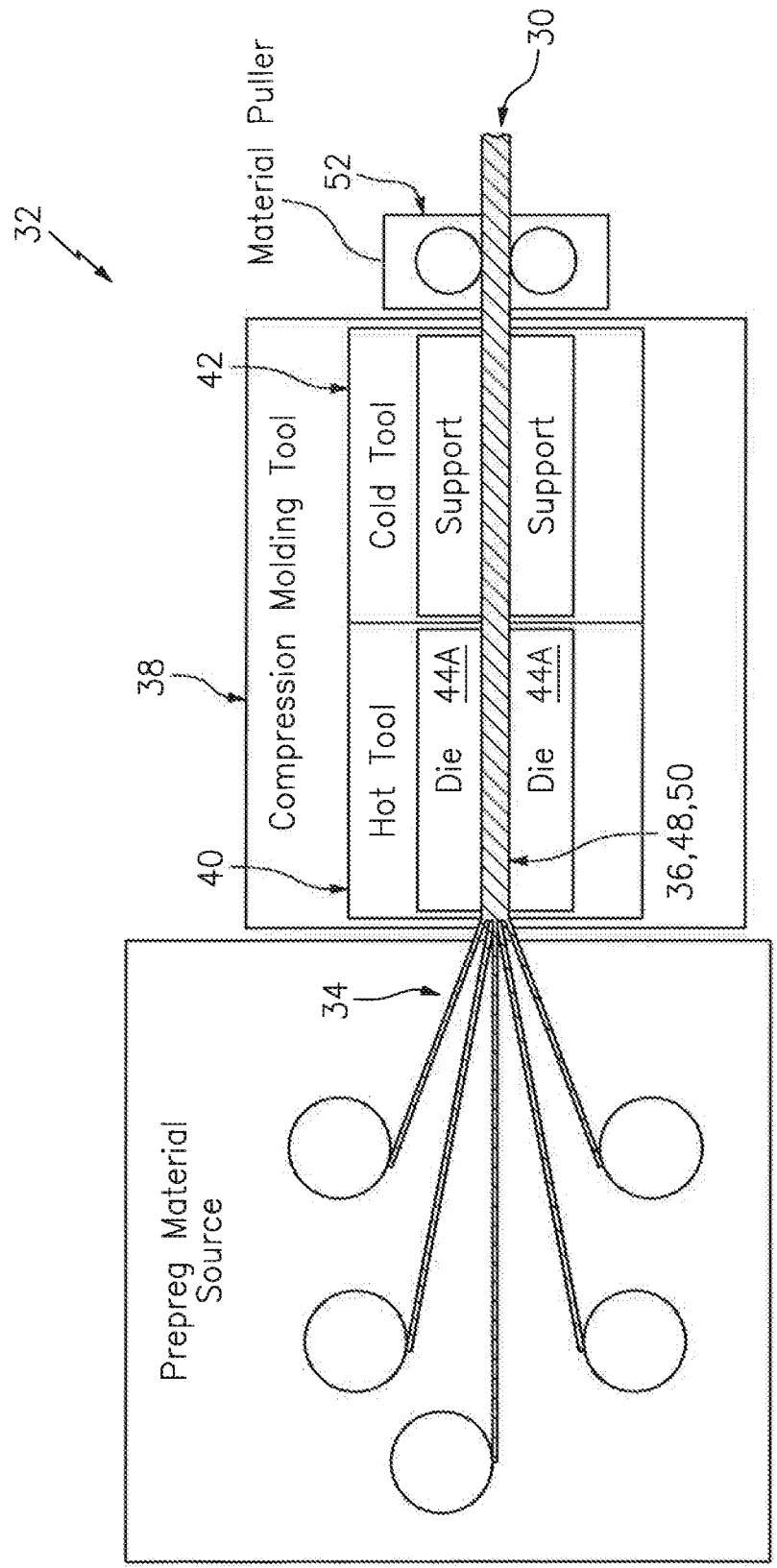
FIG. 3 is a schematic illustration of a system for manufacturing the composite body during formation of a first portion of the composite body.

FIG. 2 is a flow diagram of a method 200 for manufacturing the structural support 30 of FIG. 1. This method 200 may utilize a manufacturing system 32 as schematically shown in FIG. 3 to perform steps thereof. The method 200, of course, may alternatively be performed with a manufacturing system other than that shown of FIG. 3. Furthermore, the method 200 may alternatively be performed to manufacture various other types of composite bodies, non-limiting examples of which are list above.

In step 202, a continuous (e.g., uncut, undivided) length of prepreg material 34 is provided. This prepreg material 34 includes fibrous material which has been pre-impregnated with resin; e.g., embedded within a resin matrix. As a result, in the exemplary method 200, no additional resin needs to be added to form the composite body during subsequent manufacturing steps. Of course, in other embodiments, additional resin may be added to supplement the pre-impregnated resin during a subsequent step (or steps) of the structural support 30 manufacture.

Examples of the fibrous material may include, but are not limited to, fiberglass material, carbon fiber material, aramid material (e.g., Kevlar® fibers) or a combination of at least two (or only) two or more of the foregoing fibrous materials. The fibrous material may be woven together using, for example, two-dimensional (2-D) or three-dimensional (3-D) weaving techniques to provide a mat, sheet or tape of woven fibrous material. Alternatively, the fibrous material may be accumulated together into a mat, sheet or tape of randomly oriented (e.g., chopped or short.) fibers. Still alternatively, the fibrous material may be provided together as parallel discrete strands of continuous or long fibers, or any other suitable grouping of fiber reinforcement.

The resin may be a thermoplastic resin. Alternatively, the resin may be a thermosetting resin.

In step 204, a first longitudinal portion 36 of the continuous length of prepreg material 34 ("first longitudinal portion of material") is moved (e.g., fed) into a compression molding tool 38. An exemplary embodiment of this compression molding tool 38 is illustrated in FIG. 3. This exemplary compression molding tool 38 includes a hot tool 40 and a cold tool 42; however, in some embodiments, the cold tool 42 may be omitted.

The hot tool 40 is configured to shape a received longitudinal portion of material. The hot tool 40 is also configured to thereafter (or substantially simultaneously) consolidate the shaped longitudinal portion of material.

The hot tool 40 includes one or more dies 44A, 44B (see FIGS. 3-8; generally referred to as "44") and 46. In the exemplary embodiment shown in FIGS. 3-8, the hot tool 40 uses a quantity of four dies at one time; two of the side dies 44A, 44B and two of the top/bottom dies 46. However, the hot tool 40 of the present disclosure is not limited to such an exemplary number of dies; e.g., the hot tool 40 may use less or more than four dies at one time. The compression molding tool 38 may include more than the above-discussed four dies therewith. For example, replacement dies 44B may be configured with (e.g., located within and/or coupled to) the compression molding tool 38 (e.g., within or outside of its hot tool 40), but not used during a select shaping step as described below. Some of these replacement dies may have the same or similar configuration to the dies being used. Other replacement dies may have different configurations to the dies being used as discussed below, which include dies for forming objects with the various cross-sections of FIGS. 9A-9P.

Figure 4:
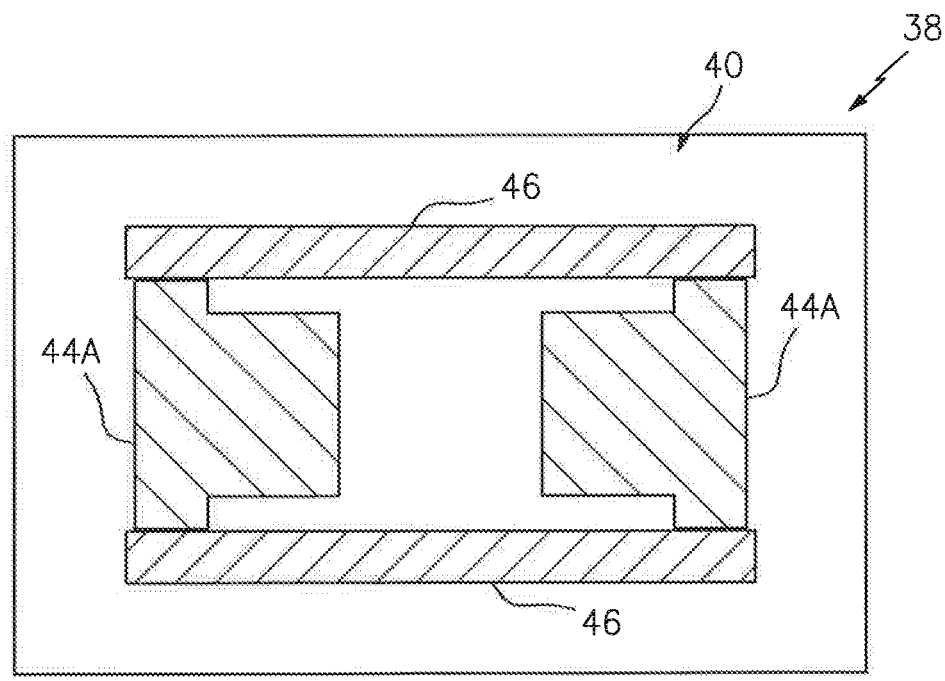
FIG. 4 is a schematic illustration of dies in an open position.
Figure 5:
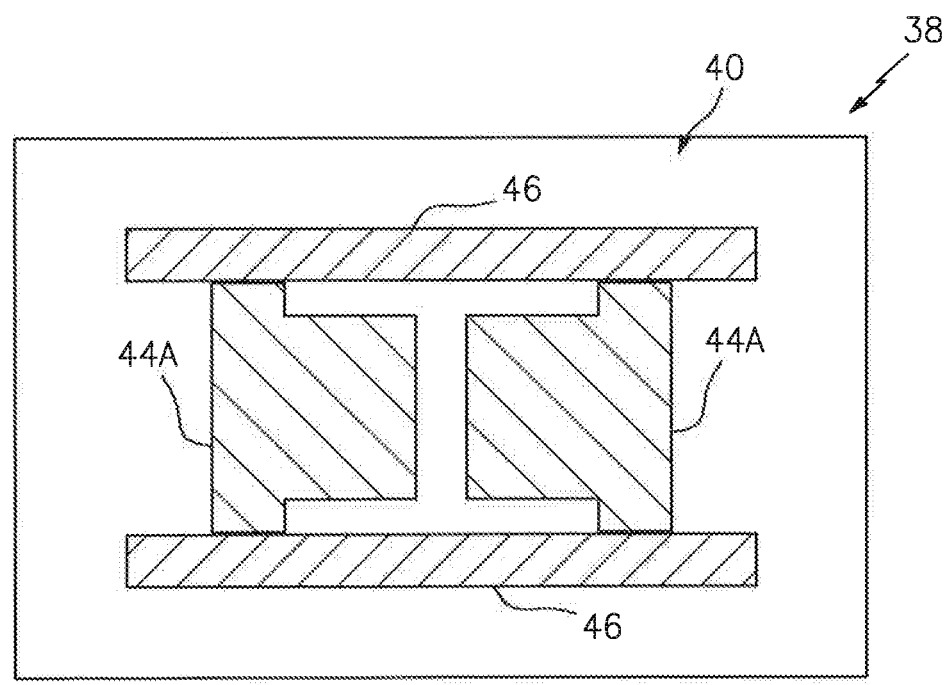
FIG. 5 is a schematic illustration of the dies of FIG. 4 in a closed position.

The dies 44A (e.g., an initial set of dies) are configured to move between an open position as shown in FIG. 4 and a closed position as shown in FIG. 5. One or more of the dies 44A are removably attached and/or movable (repositionable) within the compression molding tool 38 such that those one or more dies 44A may each be swapped out for/replaced by another die (e.g., a replacement die 44B) during the performance of the method 200 as described below. In the embodiment of FIG. 3, the dies 46 may be configured as stationary dies. However, in other embodiments, the dies 46 may also be moveable and/or replaceable.

The cold tool 42 is configured to cool the shaped and consolidated longitudinal portion of material. The cold tool 42 is also configured to support the shaped and consolidated longitudinal portion of material while another longitudinal portion of the continuous length of prepreg material 34 is being shaped and consolidated by the hot tool 40.

In step 206, the first longitudinal portion 36 of material is shaped by the hot tool 40 to provide a shaped first longitudinal portion 48 of the continuous length of prepreg material 34 ("shaped first longitudinal portion of material"). For example, the first longitudinal portion 36 of material is fed into the hot tool 40 between the dies 44A while the dies 44A are in the open position of FIG. 4. Once this first longitudinal portion 36 of material is properly position within the hot tool 40, one or more of the dies 44A and 46 are moved from the open position of FIG. 4 to the closed position of FIG. 5 in order to provide the first longitudinal portion 36 of material with a first configuration. In particular, the dies 44A compress the first longitudinal portion 36 of material into a first cross-sectional geometry (e.g., shape and size) and a first longitudinal geometry (e.g., longitudinal curvature).

In step 208, the shaped first longitudinal portion 48 of material is consolidated by the hot tool 40 to provide a first longitudinal portion 50 of the structural support 30. For example, one or more of the dies 44A and 46 subject the shaped first longitudinal portion 48 of material to an elevated pressure and/or an elevated temperature for a desired period of time to facilitate the consolidation of the resin in the prepreg material 34.

Figure 6:
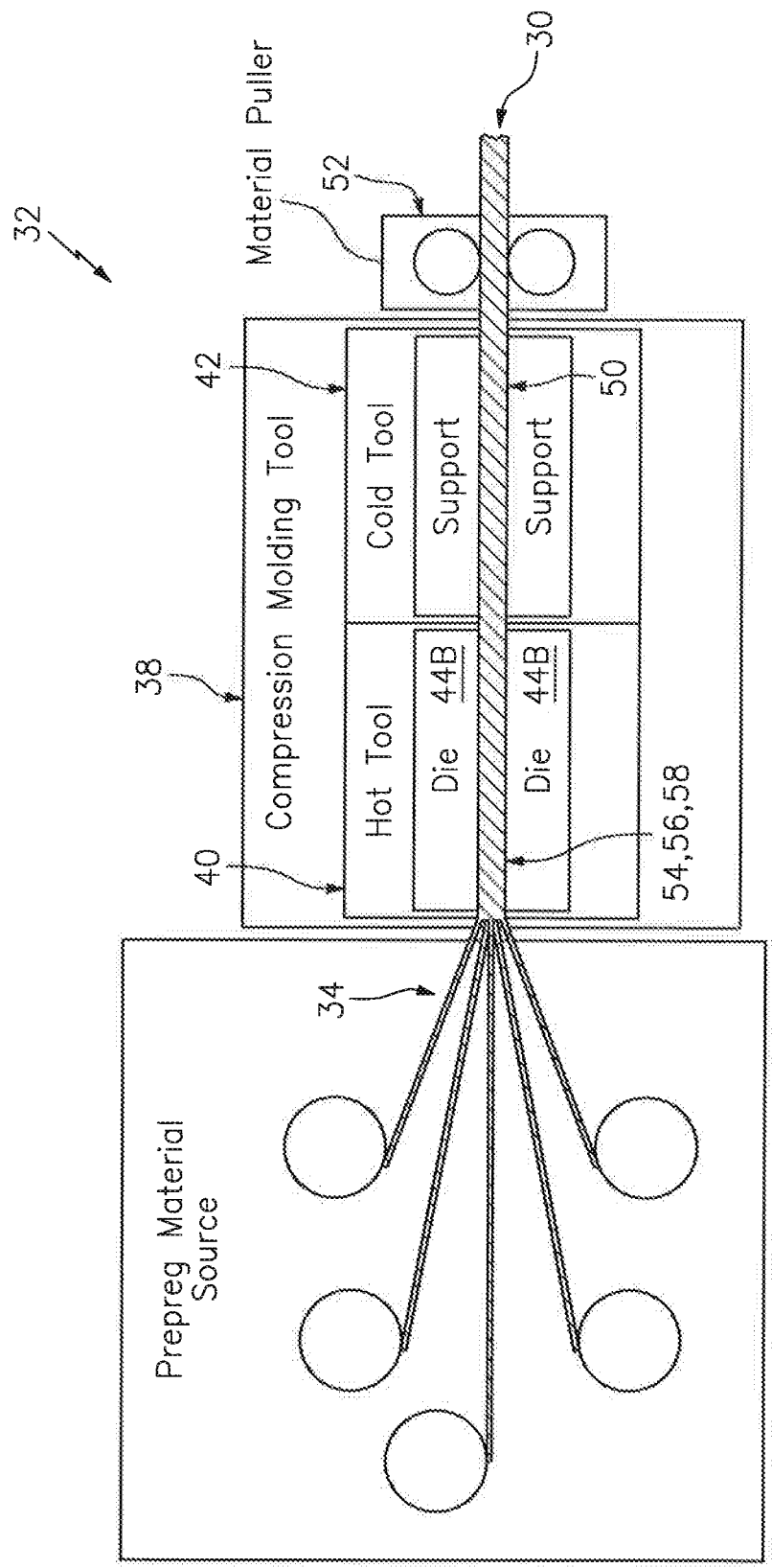
FIG. 6 is a schematic illustration of the system for manufacturing the composite body during formation of a second portion of the composite body.
Figure 7:
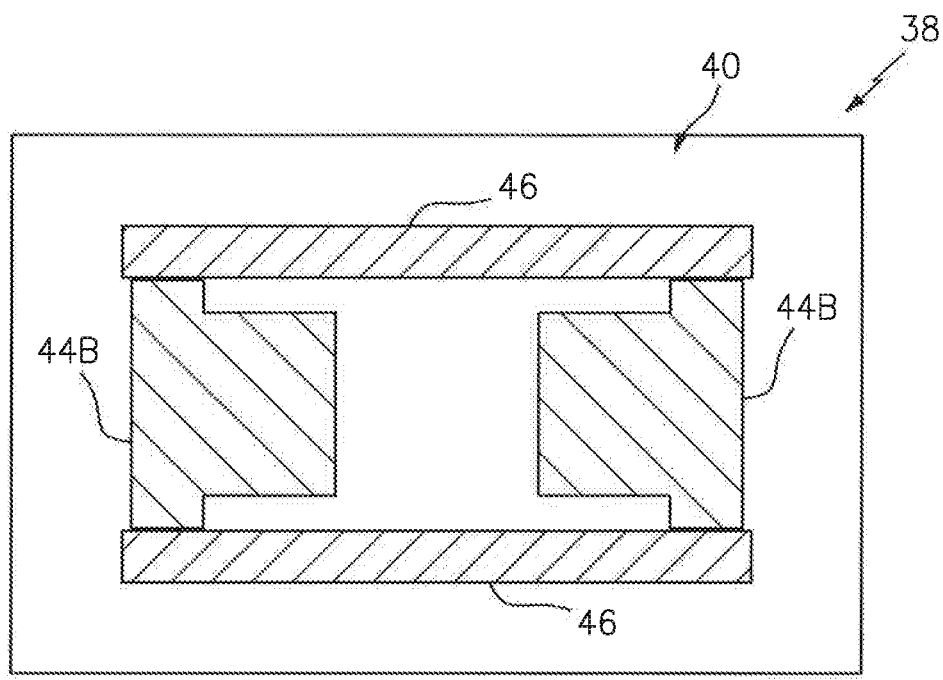
FIG. 7 is a schematic illustration of dies in an open position.
Figure 8:
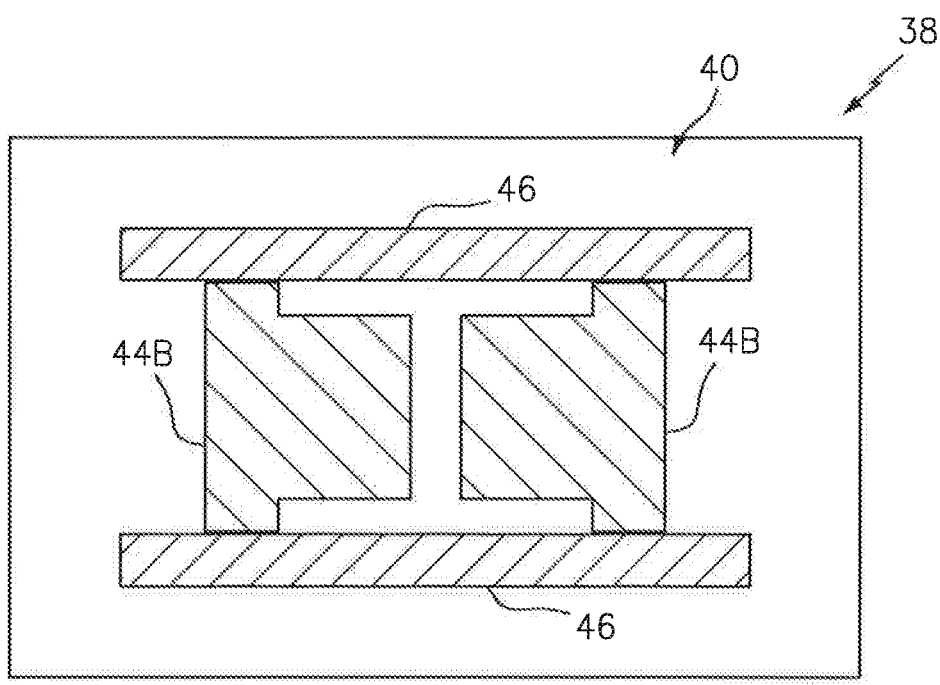
FIG. 8 is a schematic illustration of the dies of FIG. 7 in a closed position.

In step 210, the first longitudinal portion 50 of the structural support 30 is moved from the hot tool 40 and into the cold tool 42 using, for example, a material puller 52 as shown in FIG. 6. In addition, a second longitudinal portion 54 of the continuous length of prepreg material 34 ("second longitudinal portion of material") is moved into the compression molding tool 38 and its hot tool 40.

In step 212, one or more of the dies 44A used to form the first longitudinal portion 50 of the structural support 30 are swapped for one or more different replacement dies 44B. In particular, during formation of the first longitudinal portion 50 of the structural support 30, each die 44A is arranged at a respective molding position within the hot tool 40 (see FIGS. 3-5). During the step 212, each die 44A is removed from the respective molding position and one of the replacement dies 44B is arranged at that respective molding position thereby replacing the die 44A (see FIGS. 6-8). The die 44A may then be arranged at another location (e.g., a storage location not shown) within the compression molding tool 38, or removed completely from the compression molding tool 38. This rearrangement of the dies 44 may be performed manually; e.g., by hand. Alternatively, the rearrangement of the dies 44 may be performed automatically by a machine such as a robotic tool; e.g., a manipulator.

In step 214, the second longitudinal portion 54 of material is shaped by the hot tool 40 to provide a shaped second longitudinal portion 56 of the continuous length of prepreg material 34 ("shaped second longitudinal portion of material"). For example, the second longitudinal portion 54 of material is fed into the hot tool 40 between the dies 44B and 46 while the replacement dies 44B are in the open position of FIG. 7. Once this second longitudinal portion 54 of material is properly position within the hot tool 40, one or more of the replacement dies 44B are moved from the open position of FIG. 7 to the closed position of FIG. 8 in order to provide the second longitudinal portion 54 of material with a second configuration. In particular, the replacement dies 4413 compress the second longitudinal portion 54 of material into a second cross-sectional geometry (e.g., shape and size) and a second longitudinal geometry (e.g., longitudinal curvature).

The second configuration of the shaped second longitudinal portion 56 of material is different than the first configuration of the shaped first longitudinal portion 48 of material as a result of using different dies 44A and 4413 having different die configurations during the shaping thereof For example, while the shaped second longitudinal portion 56 of material and the shaped first longitudinal portion 48 of material may share a common cross-sectional shape and size, the longitudinal curvature of the shaped second longitudinal portion 56 of material may he different than that of the shaped first longitudinal portion 48 of the material; e.g., see first and second portions 50 and 58 of the structural support 30 shown in FIG. 1. Of course, in addition or alternatively, the cross-sectional shape and/or size (e.g., width, height, thickness) of the shaped second longitudinal portion 56 of material may be different than that of the shaped first longitudinal portion 48 of the material. As a result, the configuration of the structural support 30 being manufactured may he varied during manufacture. Furthermore, the structural support 30 design may be altered by swapping one or more dies 44 and/or 46 depending upon. the scope of the alteration.

In step 216, the shaped second longitudinal portion 56 of material is consolidated by the hot tool 40 to provide a second longitudinal portion 58 of the structural support 30. For example, one or more of the dies 4413 and 46 subject the shaped second longitudinal portion 56 of material to an elevated pressure and/or an elevated temperature for a desired period of time to facilitate the consolidation of the resin in the prepreg material 34.

In step 218, the second longitudinal portion 58 of the structural support 30 is moved from the hot tool 40 and into the cold tool 42 using, for example, the material puller 52. in addition, a third longitudinal portion of the continuous length of prepreg material 34 may be moved into the compression molding tool 38 and its hot tool 40.

In step 220, the second longitudinal portion 58 of the structural support 30 may be moved out of the compression molding tool 38 and cut away from an upstream (e.g., left-hand-side) portion of material 34 where formation of the structural support 30 is complete. Alternatively, one or more of the previous methods steps may be repeated to facilitate formation of additional portions of the structural support 30. During repetition of these steps, one or more additional portions of the structural support 30 may be formed with the same configuration as the first and/or the second portions 50, 58 of the structural support 30. In addition or alternatively, one or more additional portion of the structural support 30 may be formed with different configurations from the first and the second portions 50 and 58 of the structural support 30.

Figure 9A:
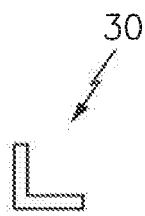
FIGS. 9A-9P are illustrations of various exemplary composite body cross-sectional geometries.
Figure 9B:
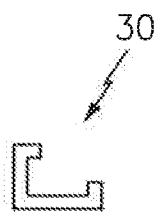
Figure 9C:
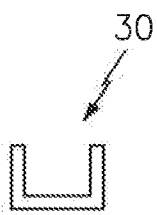
Figure 9D:
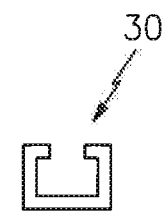
Figure 9E:
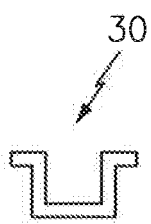
Figure 9F:
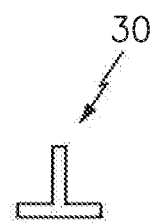
Figure 9G:
Figure 9H:
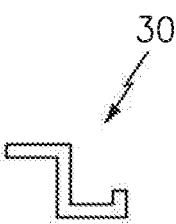
Figure 9I:
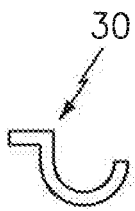
Figure 9J:
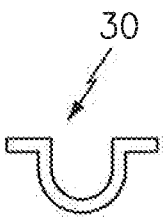
Figure 9K:
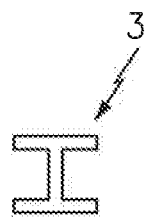
Figure 9L:
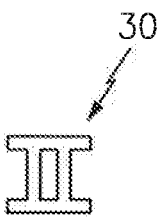
Figure 9M:
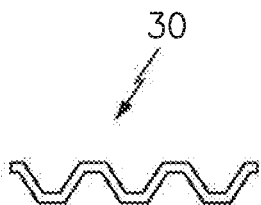
Figure 9N:
Figure 9O:
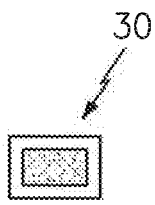
Figure 9P:

Each portion (e.g., 50, 58) of the structural support 30 may be formed with various cross-sectional shapes. Exemplary cross-sectional shapes are shown in FIGS. 9A-9P. The present disclosure, of course, is not limited to the illustrated exemplary cross-sectional shapes.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A method for manufacturing a composite body, comprising:

shaping a first longitudinal portion of a continuous length of prepreg material using a first die, a second die, a third die and a fourth die of a compression molding tool to provide a shaped first longitudinal portion of the continuous length of prepreg material, wherein the first die is arranged at a molding position in the compression molding tool during the shaping of the first longitudinal portion of the continuous length of prepreg material, wherein the first die and the second die are arranged between a third die surface of the third die and a fourth die surface of the fourth die that is positioned opposite the third die surface, and wherein the shaping comprises moving at least one of the first die or the second die along the third die surface and the fourth die surface such that the first longitudinal portion of the continuous length of prepreg material contacts and is compressed between the first die, the second die, the third die and the fourth die;

consolidating the shaped first longitudinal portion of the continuous length of prepreg material using the compression molding tool to provide a first portion of the composite body;

moving the first portion of the composite body out of the compression molding tool;

swapping the first die for a replacement first die, the swapping comprising removing the first die from the molding position and arranging the replacement first die at the molding position;

shaping a second longitudinal portion of the continuous length of prepreg material using the replacement first die of the compression molding tool to provide a shaped second longitudinal portion of the continuous length of prepreg material, wherein the replacement first die is arranged at the molding position during the shaping of the second longitudinal portion of the continuous length of prepreg material; and consolidating the shaped second longitudinal portion of the continuous length of prepreg material using the compression molding tool to provide a second portion of the composite body.

2. The method of claim 1, wherein the first die has a die first configuration and the replacement first die has a die second configuration that is different from the die first configuration.

3. The method of claim 1, wherein
the first die is configured to provide the shaped first longitudinal portion of the continuous length of prepreg material with a first curvature; and
the replacement first die is configured to provide the shaped second longitudinal portion of the continuous length of prepreg material with a second curvature that is different from the first curvature.

4. The method of claim 1, wherein
the first die is configured to provide the shaped first longitudinal portion of the continuous length of prepreg material with a first cross-sectional geometry; and
the replacement first die is configured to provide the shaped second longitudinal portion of the continuous length of prepreg material with a second cross-sectional geometry that is different from the first cross-sectional geometry.

5. The method of claim 4, wherein
the first die is configured to provide the shaped first longitudinal portion of the continuous length of prepreg material with a first cross-sectional shape; and
the replacement first die is configured to provide the shaped second longitudinal portion of the continuous length of prepreg material with a second cross-sectional shape that is different from the first cross-sectional shape.

6. The method of claim 4, wherein
the first die is configured to provide the shaped first longitudinal portion of the continuous length of prepreg material with a first cross-sectional size; and
the replacement first die is configured to provide the shaped second longitudinal portion of the continuous length of prepreg material with a second cross-sectional size that is different from the first cross-sectional size.

7. The method of claim 1, wherein
the consolidating of the shaped first longitudinal portion of the continuous length of prepreg material comprises heating and applying pressure to the shaped first longitudinal portion of the continuous length of prepreg material using the first die; and
the consolidating of the shaped second longitudinal portion of the continuous length of prepreg material comprises heating and applying pressure to the shaped second longitudinal portion of the continuous length of prepreg material using the replacement first die.

8. The method of claim 1, further comprising:
swapping the second die for a replacement second die;
wherein the shaping of the first longitudinal portion of the continuous length of prepreg material comprises shaping the first longitudinal portion of the continuous length of prepreg material using the first die and the second die to provide the shaped first longitudinal portion of the continuous length of prepreg material; and
wherein the shaping of the second longitudinal portion of the continuous length of prepreg material comprises shaping the second longitudinal portion of the continuous length of prepreg material using the replacement first die and the replacement second die to provide the shaped second longitudinal portion of the continuous length of prepreg material.

9. The method of claim 1, further comprising:
moving the second portion of the composite body out of the compression molding tool;
swapping the replacement first die for a second replacement first die;
shaping a third longitudinal portion of the continuous length of prepreg material using the second replacement first die of the compression molding tool to provide a shaped third longitudinal portion of the continuous length of prepreg material; and
consolidating the shaped third longitudinal portion of the continuous length of prepreg material using the compression molding tool to provide a third portion of the composite body.

10. The method of claim 1, further comprising:
moving the second portion of the composite body out of the compression molding tool;
shaping a third longitudinal portion of the continuous length of prepreg material using the replacement first die of the compression molding tool to provide a shaped third longitudinal portion of the continuous length of prepreg material; and
consolidating the shaped third longitudinal portion of the continuous length of prepreg material using the compression molding tool to provide a third portion of the composite body.

11. The method of claim 1, wherein the continuous length of prepreg material comprises fibrous material pre-impregnated with thermoplastic resin.

12. The method of claim 1, wherein the composite body comprises a component of a nacelle for an aircraft propulsion system.

13. A method for manufacturing a composite body, comprising:
molding a first longitudinal portion of a continuous length of prepreg material into a first portion of the composite body using a first die, a second die, a third die and a fourth die, wherein the first die and the second die are arranged between the third die and the fourth die such that a molding cavity, in which the first longitudinal portion of the continuous length of prepreg material is molded, is defined by at least a first die surface of the first die, a second die surface of the second die, a third die surface of the third die and a fourth die surface of the fourth die, wherein the molding comprises moving at least one of the first die or the second die along the third die surface and the fourth die surface, and wherein the first die provides the first portion of the composite body with a first configuration;
swapping the first die for a replacement first die, the swapping comprising removing the first die from a molding position and arranging the replacement first die into the molding position; and
molding a second longitudinal portion of the continuous length of prepreg material into a second portion of the composite body using the replacement first die, wherein the replacement first die provides the second portion of the composite body with a second configuration that is different from the first configuration;

wherein the continuous length of prepreg material comprises fibrous material pre-impregnated with resin.

14. The method of claim 13, wherein the first die is configured to provide the first portion of the composite body with a first curvature; and the replacement first die is configured to provide the second portion of the composite body with a second curvature that is different from the first curvature.

15. A method for manufacturing a composite body, comprising:

molding a first longitudinal portion of a continuous length of prepreg material into a first portion of the composite body using a first die, a second die, a third die and a fourth die, the first die comprising a die first configuration, wherein the first die and the second die are arranged between and contact the third die and the fourth die, and the molding comprises sliding at least one of the first die or the second die along the third die and the fourth die such that the first longitudinal portion of the continuous length of prepreg material contacts and is compressed between the first die, the second die, the third die and the fourth die to form the first portion of the composite body;

swapping the first die for a replacement first die, the replacement first die comprising a die second configuration that is different from the die first configuration; and molding a second longitudinal portion of the continuous length of prepreg material into a second portion of the composite body using the replacement first die;

wherein the continuous length of prepreg material comprises fibrous material pre-impregnated with resin.

16. The method of claim 15, further comprising providing a compression molding tool, wherein the first die and the replacement first die are both configured with the compression molding tool during the molding of the first longitudinal portion of the continuous length of prepreg material.

17. The method of claim 15, wherein the first die provides the first portion of the composite body with a body first configuration; and the replacement first die provides the second portion of the composite body with a body second configuration that is different from the body first configuration.

18. The method of claim 15, wherein the first die is configured to provide the first portion of the composite body with a first curvature; and the replacement first die is configured to provide the second portion of the composite body with a second curvature that is different from the first curvature.

19. The method of claim 15, wherein the molding of the first longitudinal portion of the continuous length of prepreg material comprises:

shaping the first longitudinal portion of the continuous length of prepreg material using the first die of a compression molding tool to provide a shaped first longitudinal portion of the continuous length of prepreg material; and consolidating the shaped first longitudinal portion of the continuous length of prepreg material using the compression molding tool to provide the first portion of the composite body.

20. The method of claim 15, wherein the first die is arranged at a molding position in a hot tool of a compression molding tool during the molding of the first longitudinal portion of the continuous length of prepreg material; and the swapping comprises removing the first die from the molding position and the hot tool and arranging the replacement first die at the molding position in the hot tool.

* * * * *